INVENTOR
HELMUTH SILBERZAHN
by Jacob L. Kollin
ATTORNEY

March 1, 1966     H. SILBERZAHN     3,237,632
APPARATUS FOR CLEANING PARTICULARLY HEAVILY SOILED BOTTLES
Filed Feb. 21, 1964     7 Sheets-Sheet 2

INVENTOR
HELMUTH SILBERZAHN
by
Jacob L. Kollin
ATTORNEY

March 1, 1966 H. SILBERZAHN 3,237,632
APPARATUS FOR CLEANING PARTICULARLY HEAVILY SOILED BOTTLES
Filed Feb. 21, 1964 7 Sheets-Sheet 3

INVENTOR
HELMUTH SILBERZAHN
by Jacob L. Kollin,
ATTORNEY

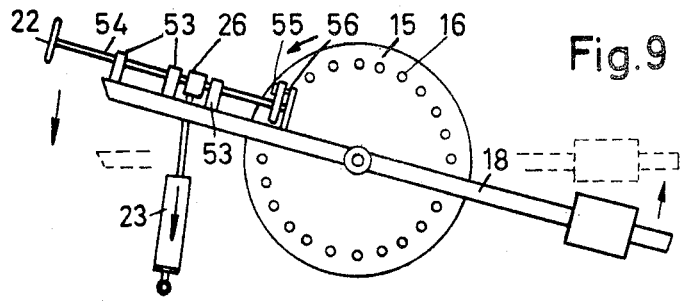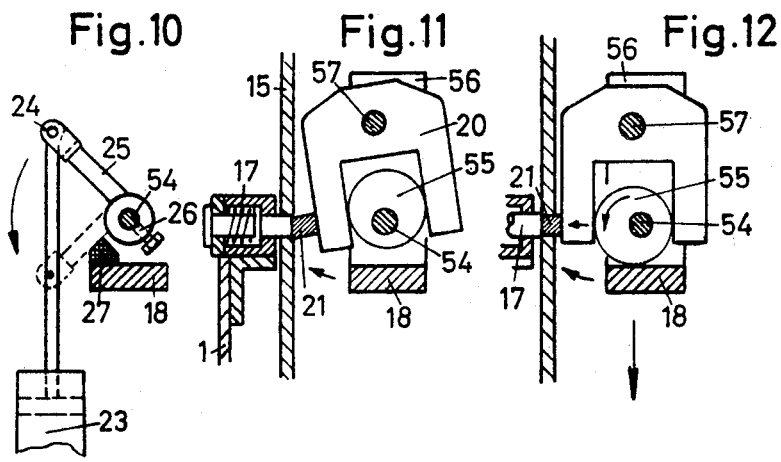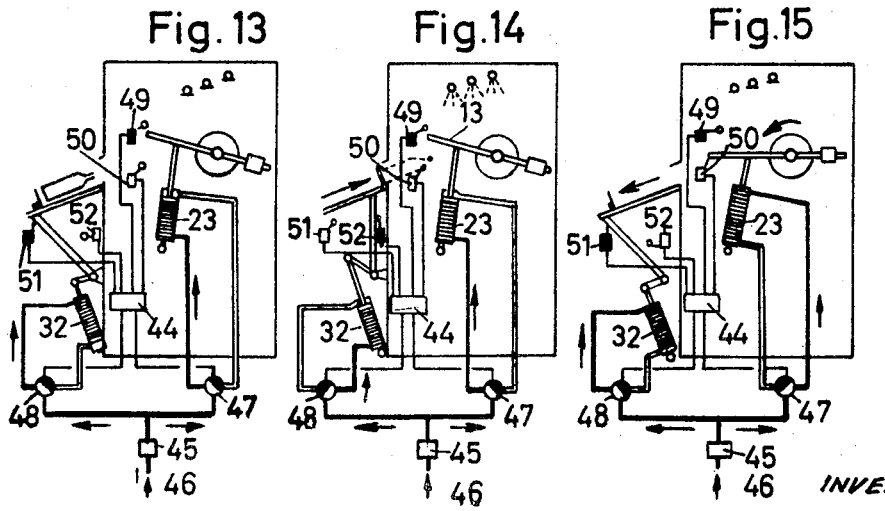

March 1, 1966  H. SILBERZAHN  3,237,632
APPARATUS FOR CLEANING PARTICULARLY HEAVILY SOILED BOTTLES
Filed Feb. 21, 1964  7 Sheets-Sheet 5

INVENTOR
HELMUTH SILBERZAHN
by Jacob L. Kollin
ATTORNEY

March 1, 1966      H. SILBERZAHN      3,237,632
APPARATUS FOR CLEANING PARTICULARLY HEAVILY SOILED BOTTLES
Filed Feb. 21, 1964      7 Sheets-Sheet 6
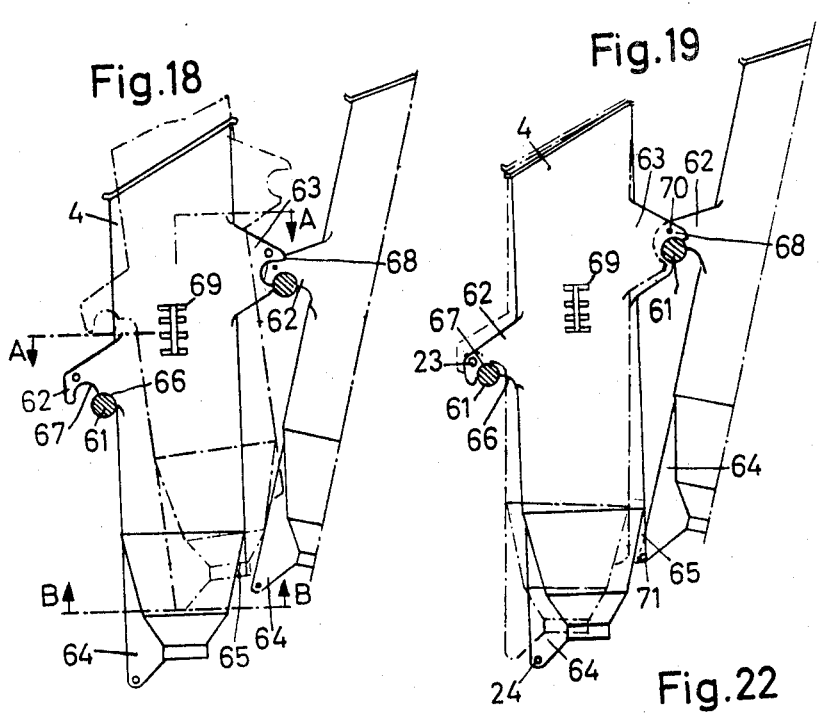
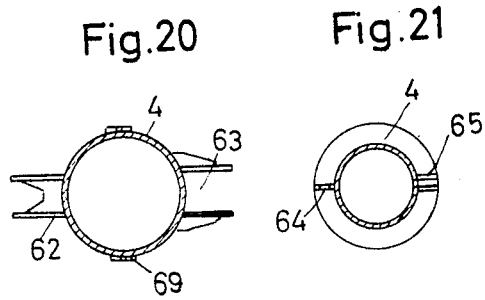
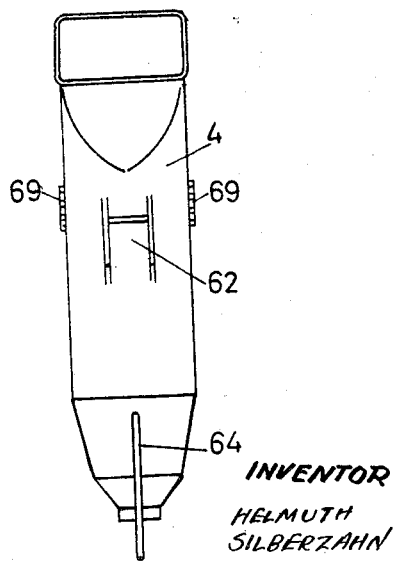
INVENTOR
HELMUTH SILBERZAHN
by Jacob L. Kolhn
ATTORNEY March 1, 1966  H. SILBERZAHN  3,237,632
APPARATUS FOR CLEANING PARTICULARLY HEAVILY SOILED BOTTLES
Filed Feb. 21, 1964  7 Sheets-Sheet 7

INVENTOR
HELMUTH SILBERZAHN
by Jacob L. Kollin
ATTORNEY 3,237,632
APPARATUS FOR CLEANING PARTICULARLY HEAVILY SOILED BOTTLES
Helmuth Silberzahn, Burgermeister-Renz-Strasse 1, Mosbach, Germany
Filed Feb. 21, 1964, Ser. No. 346,531
Claims priority, application Germany, Feb. 25, 1963, S 83,888; May 17, 1963, S 85,270; Oct. 22, 1963, S 87,965
6 Claims. (Cl. 134—142)

The invention has for its object the cleaning of heavily soiled bottles, and also of such bottles which cannot be cleaned with known cleaning devices operated with cold and hot leaching solutions. The invention concerns itself, for example, with bottles having cement or mortar residues such as accumulate at construction sites, mineral water bottles with deposited mineral salts, wine bottles with tartar deposits and similar contaminated bottles, which may be cleaned only with acids or special cleaning solutions.

The invention offers a simple solution of the above task and makes possible the economical cleaning of bottles, which cannot be cleaned with usual bottle cleaning machines, with a slight loss of cleaning fluid, economical use of flushing fluid and with the simplest loading and unloading.

The device according to the invention comprises a tank or vessel containing the cleaning fluid and a dipping wheel rotatable about a horizontal axle. This dipping wheel carries about its periphery a number of bottle compartments or cells formed with conical portions for receiving the neck portions of the bottles, the axes of the cells being inclined to the planes of the axes of the bottle cells of a cell rim and adjacent the outwardly disposed bottle insertion openings thereof, there is disposed a stationary supporting or holding yoke which partly covers the base opening and extends with its outer surfaces concentrically to the peripheral circle of the dipping wheel. The yoke prevents the automatic dropping out of the bottles which are inserted in the individual cells during the passage of the cleaning fluid, while at the same time carrying out predetermined movements in the cells, to assist with the cleaning. In each instance the dirt particles, foil on the bottle neck and various glass splinters of bottle bottoms fall sideways of the holding yoke and sink to the bottom of the tank, whence they are disposed of during the changing of the cleaning fluid. The disposal of these cleaned particles may be effected by special filter devices which may be installed for a continuous disposal, particularly the disposal of labels.

When the soiled bottles inserted in the bottle cells are dipped in the cleaning bath, the air from the bottle interior escapes and the cleaning fluid next enters the bottle neck of the upright disposed bottle. As the bottles advance through the bath they are displaced with their cell more and more until they are finally arranged in the tank with their bottle necks directed downward and the residual content flows back into the cleaning fluid container.

Above this container and shielded from it, are arranged devices for spraying the bottles from without and for flushing the interior with cold water. These devices can be constructed in a known manner. Spray nozzles, for example, may be used which are so arranged that they are capable of spraying from below the bottles which are arranged in cells with their necks downwardly, and thereby rinse the interior of the bottles. At least one spray nozzle is arranged above the insertion openings of the cells, for cleaning the outer surface of the bottle. The washing fluid is collected in a drain constructed as a tub from which the rinsing fluid, especially cold water is led away.

When bottle cells with closed cover cells are used, the cleaning fluid can be considerably economized, since it may be employed in such a manner that the spray water will reach only into the interior of the bottle cells. In this case the displacement loss of the cleaning fluid is slight, because the outer surfaces of the cells are now no longer sprayed. These contain the covering film in the cleaning fluid and dip with it again into the cleaning medium bath after each cycle of the dipping wheel. At least one border with shed-like bottle cells is provided at the dipping wheel. Several circular borders may be arranged in adjacent parallel planes at a required distance from one another, which advantageously may be so arranged that the individual adjacent cells are aligned with one another. When several such bottle cells borders are arranged, they are mounted on common supports which are freely carried by the dipping wheel on one side or be centrally freely suspended on both sides, or are carried on supporting rollers at the bottom of the tank or container. A permanent arrangement for flushing the bottles in the circular borders is thus made possible without obstruction of the particular side.

The bottle cells disposed behind one another on the dipping wheel may be rigidly secured. They may also be arranged swingably on the dipping wheel by means of pivots or similar devices. It is then possible to arrange their inclinations as required. This may advantageously be done by a common adjustment for all cells. The rotation of the dipping wheel may be continuous and/or stepwise. Since the device according to the invention is in many cases arranged exteriorly of the usual path of the empty bottles through the cleaning apparatus, labeling machines, filling machines, sealing machines etc., it is sufficient, in most instances, to employ a manual or foot operation. It is advantageous to operate the particular switch elements, e.g., a position pedal in such a manner that each arcuate space between two adjacent bottle cells is moved stepwise. Obviously, it is possible to employ, both for continuous, as well as stepwise use, a mechanical drive, such as an electromotor or hydraulic or pneumatic actuating devices. When a motor drive is used, it may operate continuously even for stepwise employment. The drive for the wheel is uncoupled stepwise by means of a suitable coupling. This may be done independently so that the devices according to the invention may be installed for fully automatic operation without difficulty. Depending on whether a stepwise or continuous operational cycle is provided, devices for the inner and outer spraying of the bottles emerging from the cleaning bath are provided. Consideration may be given to arranging a number of spray jets at the conical end of the bottle cells, concentrically to the rotational curve of the inwardly directed outlet openings and a further quantity of spray jets on a corresponding arc closely above the insertion openings of the bottle cells, which will spray continuously, so that with a slow rotation of the bottle cells an excellent spraying of the bottles from within and without will be achieved. When it is necessary to conserve spraying fluid it may be advantageous to operate the entire system synchronously with the wheel for a certain distance and to return it into high speed. In this instance the distance of the jets corresponds to the distance of the adjacent bottle cells. The interior cleaning of the bottles may be achieved with certainty with only small quantities of fluid, by employing jets directed at the axes of the bottle necks. The minimum employment of spraying fluid is assured by a stepwise operation. It is thus sufficient to employ a single jet directed at the bottles' axes, for every undertaking. In this case the interior spraying likewise takes places at intervals, i.e. the valves for supplying the cleaning fluid are open when the dipping wheel remains in one position.

Several embodiments of the invention with a number of characteristics are shown schematically and with various operating devices in the accompanying drawings in connection with the following description.

It should be understood, however, that these are given by way of illustration and not of limitation, and that various changes in the details, form and arrangement of the parts may be made without departing from the scope of the invention.

In the drawings:

FIG. 9 is an enlarged detail view of a swinging mechanism for the dipping wheel and the eccentric;

FIG. 10 is an enlarged detail of the mechanism of FIG. 9;

FIG. 11 is another enlarged detail of the mechanism of FIG. 9;

FIG. 12 is another enlarged detail of the mechanism of FIG. 9;

FIG. 13 is a schematic view of the actuating power cylinder and the control circuit;

FIG. 14 is a view similar to FIG. 13, with the cylinder in another position;

FIG. 15 is a view similar to FIG. 13, with the power cylinder in yet another position;

FIG. 18 illustrates a bottle cell during the initial installation in the dipping wheel;

FIG. 19 illustrates another position of the bottle cell during its installation in the dipping wheel;

FIG. 20 is a cross-section through a bottle cell taken along line A—A of FIG. 18;

FIG. 21 is a cross-section through a bottle cell along line B—B of FIG. 18;

FIG. 22 is a rear view of an individual bottle cell;

Figure 1:
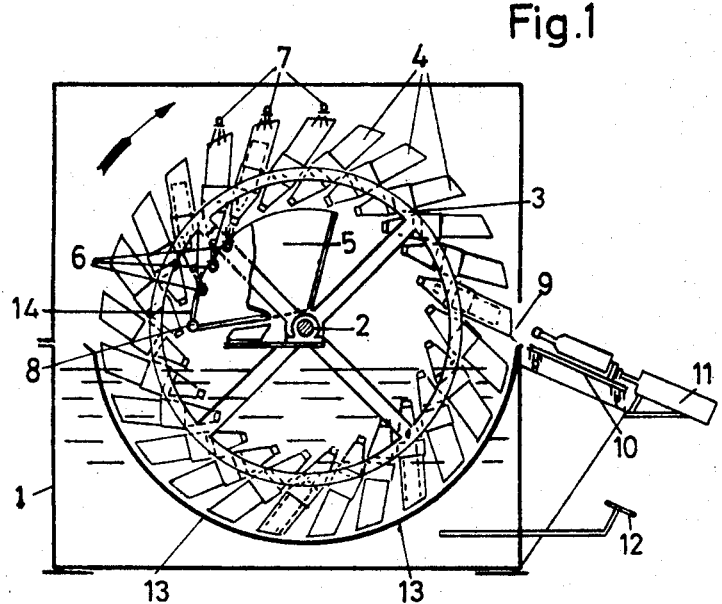
FIG. 1 illustrates one embodiment of the invention, partly in side elevation and partly in section.

Referring now to the figures in detail, the device according to FIGS. 1, 2 and 3, comprises substantially a container 1, with cleaning fluid, a rotatably mounted immersion wheel 4, on a horizontal shaft 2, bottle cell 4, mounted on the periphery of the wheel 3, the cells being mounted in an inclined position for preventing the bottles from falling out, a shielded collecting bath covered below and on the sides, disposed opposite the container for the cold flushing water, the spray nozzles 6, for the interior of the bottles and the outlet nozzles 7, for the washing fluid for the outer surfaces of the bottles. The supply connections for the washing fluid for the nozzles and the devices for controlling the valves in a desired working rhythm will be explained later in connection with another embodiment. The outlet pipe for the washing fluid, from the collecting bath is shown at 8. Loading takes place over a platform 10 from the side through a side opening 9 of the housing, which may have an inspection opening provided above it (not shown). Since the bottles in the position shown at 9 fall out of their cells 4 automatically, it suffices as a simple collecting device. This may be installed in various ways, for example, in such a manner that the cleaned bottles slide out directly onto a conveyor on which the usual bottles for the cleaning machine are transported.

The solid bottles may be loaded manually or advantageously by some kind of a pusher in one working operation for all the bottle cells in a single row.

Figure 2:
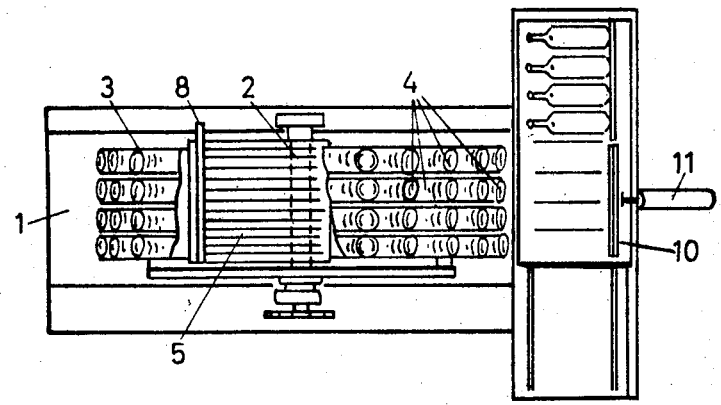
FIG. 2 is a plan view, partly in section, of the device of FIG. 1 with the housing cover removed.
Figure 3:
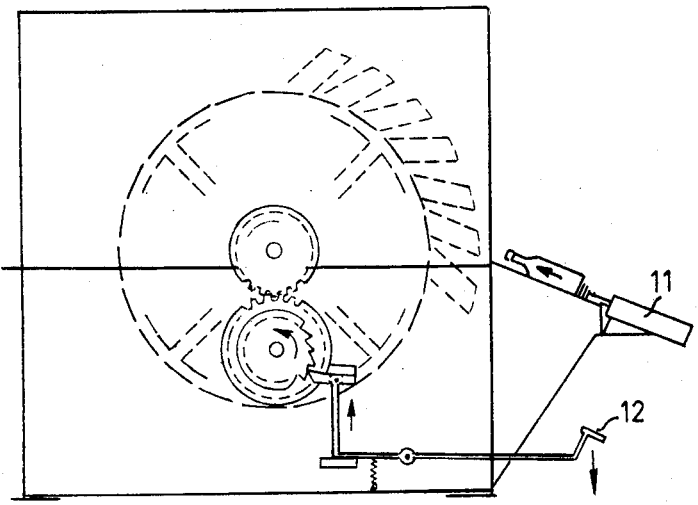
FIG. 3 is a schematic view, in side elevation, of a pedal drive.
Figure 4:
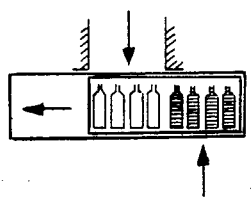
FIG. 4 illustrates schematically a phase of the loading and unloading of the dipping wheel.
Figure 5:
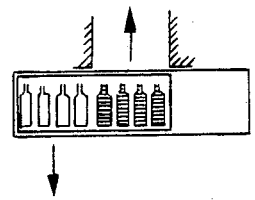
FIG. 5 illustrates schematically another phase of the loading and unloading of the dipping wheel.
Figure 6:
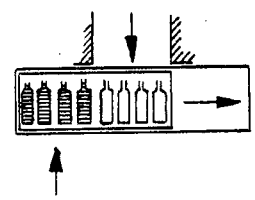
FIG. 6 illustrates schematically yet another phase of the loading and unloading of the dipping wheel.

In the embodiment of FIGS. 1, 2 and 3, the bottle cells on the immersion wheel are disposed in four adjacent planes, so that there is also provided a loading device for four bottles. The device shown in the embodiment example consists of a movable carriage which is in a position to receive a total of eight bottles, as shown in FIGS. 4–6. It travels once to the left and once to the right, so that each four bottles or the surfaces for receiving four bottles in front of the loading opening are disposed at 9.

In the position shown in FIG. 4, four bottles which have just been cleaned have emerged out of the openings of the cells. The carriage will now move to the left and the clean bottles will be removed in a desired manner. The previously placed four soiled bottles, shown in black, will be fed by a pressure piston 11, propelled by any desired pressure medium and will be inserted into the motionless bottle cells. The pedal 17 is then depressed, as shown in FIG. 3, and the dipping wheel is shifted further about the work station, in the direction of the arrow. The emptying and working cycle begins again, the carriage being in the position shown in FIG. 6. Ovbiously the further shifting of the dipping wheel and the loading may be extensively varied, as described in a further embodiment below. It will suffice for the understanding of the cleaning cycle to refer to the schematic drawing of FIG. 1. As shown in this figure, the bottles with their bottle cells extending into the cleaning bath in a tilted position, so that at first the air contained in the bottles escapes upwardly and the cleaning fluid enters the interior of the bottle.

The individual bottles now slide by stages or continuously through the bath in the direction of the arrows, while the supporting yoke 13, under the immersion wheel which is concentric with the latter prevents the bottles from falling out. The bottles, moreover, slide away with their faces past the yoke, the yoke as well as the other part of the cleaning fluid container being made out of, or having a covering of resistant materials, which are not affected by the cleaning fluid. Afater the emergence of the bottle cells and the bottles from the cleaning bath, the cleaning fluid runs back into the container. A shielded covering assures that the last spraying portion of the fluid does not reach into the bath 5 for the washing fluid.

As soon as the individual bottle cells reach the area of the lower and upper spray nozzles 7, during the further movement of the dipping wheel, the inner and outer cleaning takes place. The cleaning can be performed stepwise or continuously, as will be described subsequently.

With the machine described above and a load of 25 bottle cells for each row it is possible to reach with a contact period in the cleaning bath of 2 minutes and with manual loading an hourly capacity of 1440 bottles.

A time period of 10 seconds is assumed in this instance for loading and unloading each four bottles. Likewise, when a double time period is provided, namely 4 minutes, and a time period of 20 seconds for loading and unloading, a capacity of 720 bottles results in one hour.

The machines according to the invention may be adapted not only for cleaning stoneware or neckless bottles and other soiled bottles, but they may also be used with advantage for cleaning wine bottles and small jugs, in which to free these of accumulated tartar or wine residues.

According to FIGS. 7–15, there is shown a drive mechanism of a bottle cleaning machine according to the invention, in which the parts corresponding to those of the schematic FIGS. 1, 2 and 3 are indicated by similar numerals. In this embodiment, a perforated disk 15 provided with a plurality of holes 16 is secured to the shaft 2 outwardly of the immersion container 1. The number of these holes 16 corresponds to the number of the bottle cells 4, which are mounted obliquely on the dipping wheel 3. This perforated disk is held in a position on the immersion wheel by a locking bolt under spring tension, the bolt being appropriately arranged in the upper holding angle of the immersion container as shown in FIGS. 11 and 12. In each of the stationary positions of the dipping wheel there is disposed a bottle cell. Here several bottle cell rows are arranged adjacent one another in horizontally disposed bottle cells behind the loading and ejection opening 9. A swingable lever 18 is mounted on the dipping wheel shaft 2, a double-armed lever which in this embodiment is provided with a counterweight which serves to return the swingable lever 18 into the stationary position shown in FIGS. 7 and 9.

Figure 7:
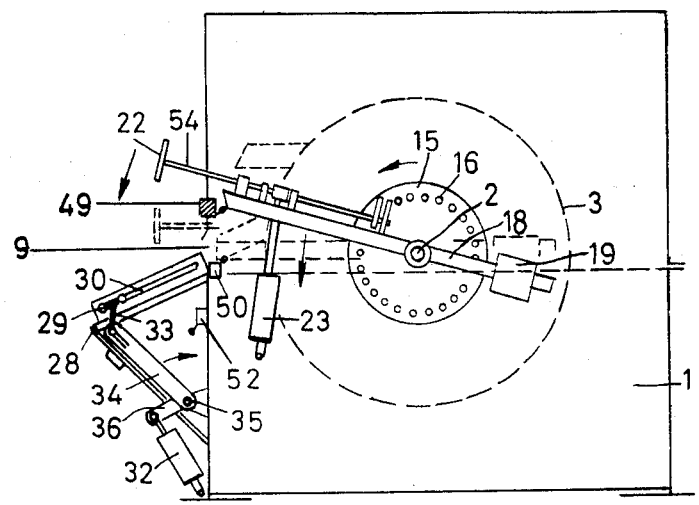
FIG. 7 illustrates another schematical embodiment of the device in side elevation viewed from the left.
Figure 17:
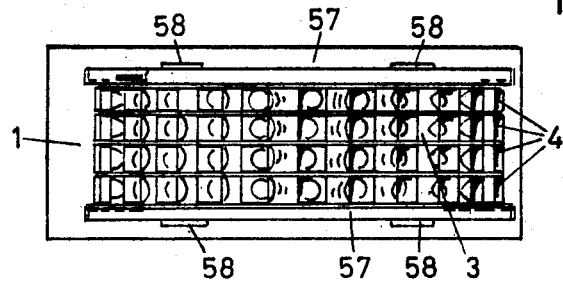
FIG. 17 is a plan view of the device of FIG. 16, with the housing cover removed.

The rotation of the dipping wheel is effected with the aid of the double-armed swingable lever 18, whereby normally the perforated disk and the dipping wheel arrive into the range of the next hole of the perforated disk downwardly, in the direction of the arrow, shown in FIGS. 7, 9 i.e. into the position shown in shaded lines. For this purpose the bolt 17 must first be dislodged from each hole of the perforated disk 15. This takes place with the aid of shaft 54, which is mounted on the double-armed swinging lever 18 at 53 and the eccentric mounted thereon, as shown in FIGS. 9, 11 and 12. A U-shaped yoke 20 is disposed externally of the eccentric 55 at the double-armed lever 18 on the support block 56 at 57. The yoke 20 carries a bolt 21 at the outer surface adjacent the perforated disk which moves to the left from the initial position of FIG. 11 into the position shown in FIG. 12 when the shaft 54, and thereby eccentric 55, moves to the left. In this position the locking bolt 17 is pressed out of its aperture in the perforated disk and thereby the impact bolt 21 is locked with the disk hole. Now the disk 15, and thus the dipping wheel swing about the opening until the next hole moves downwardly into the position shown in FIGS. 7 and 9 in shaded lines. As soon as this position is reached, the locking bolt 17 is at the level of the next hole of the perforated disk 15 and locks therein under the influence of its spring, so that from this moment on the perforated disk and the dipping wheel are detained again and the bottle cell 4 or the bottle cells lying in rows in the same planes are behind the loading or ejection opening 9. This swinging movement may be effected manually by means of the hand grip 22, provided on an extension part of the shaft 54. The manipulation is very simple. The hand grip 22 is first swung to as the left in the direction of the arrow as shown in FIG. 12. The impact bolt 21 displaces the engaging bolt 17 from a hole in the perforated disk 15 and locks in with the latter. Now the shaft 54 and therewith the double-armed swinging lever 18 are pulled downwardly about a spacing, until at the end of this swinging path the engaging bolt 17 engages in the next hole of the perforated disk and completes the swinging path. The hand grip 22 is now turned back to the right. The impact bolt is thereby disengaged from the perforated disk and is displaced from the position shown in FIG. 12 into the position shown in FIG. 11. Should now the hand grip 22 be released, the double-armed swinging lever 18 will return into the initial position shown in FIGS. 7 and 9 under the influence of its counterweight 19. The working cycle can now begin anew. This movement can take place in any desired manner. In the embodiment shown, the movement is effected by pneumatic means. A power cylinder 23, which may be actuated with compressed air, serves for this purpose. This cylinder 23 is hingedly mounted on the outer side of the dipping container 1. The free end of the piston rod terminates in the clevis link 24, as shown in FIG. 10, which is positively connected to the shaft 54 at 26. The clevis mounting 24 is necessary, in order to equalize the differences which arise during the upward and downward pulling movement of the piston rod of the power cylinder 23 and circular movement of the perforated disk 15. A suitable switching means, to be described later, conducts the pressure medium alternately to both sides of the power cylinder's piston, thus influencing its up and down movement. The swinging movement of the downwardly guiding movement of the power cylinder 23 takes place next during the first part of the downward displacement from the initial position shown in FIG. 10 into the dotted line end position opposite the stop 27 at swinging lever 18, while the cam 55 swings from the position shown in FIG. 11 to that of FIG. 17. As the piston rod moves further in a downward direction, the double-armed swinging lever 18 is taken along. At the end of this movement the pressure medium is disconnected and the piston returns upwards into the initial position shown in FIG. 10, which corresponds to that of FIGS. 7 and 9. In this case neither a counterweight or any other auxiliary force is required for returning the two-armed swinging lever 18. This counterweight is detachable, so that the mechanism shown in the embodiment of FIGS. 7–15 may be operated manually, when desired, should pressure medium be unavailable for any reason.

Figure 8:
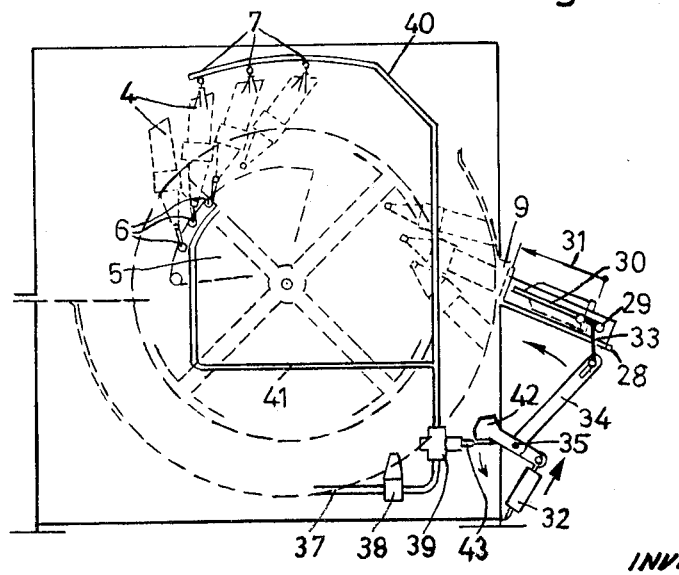
FIG. 8 is a schematic side elevation of the device viewed from the right.
Figure 16:
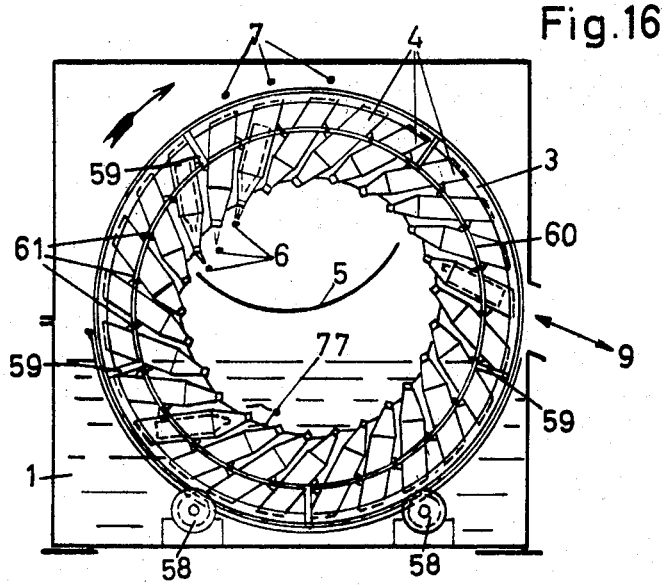
FIG. 16 is yet another embodiment, shown in schematic elevational view, partly in section.

It is sufficient in this case to loosen the detent 26 of lever 25 opposite shaft 54. A support 28 inclined downwardly at about a 30° angle, is rigidly secured under the loading and discharge opening 9 for loading the cells with soiled bottles and for receiving clean bottles emerging from the loading and discharge opening 9 (FIGS. 7 and 8). A bottle sled with a crosspiece, for supporting the bottle bottoms, is slidable on support 28 by means of rollers 29 mounted in slots 30. During the upward movement of the bottle sled from the lower position, shown in FIG. 7, in the direction of the arrow 31, into the upper position shown in FIG. 8, the soiled bottles are introduced in the bottle cells. During the return movement of the bottle sled from the position shown in FIG. 8 to that of FIG. 7, the clean bottles emerging automatically from the following bottle cells are picked up.

As shown in FIGS. 7 and 8, this movement is effected by means of a power cylinder 32, although it may also be accomplished manually. For this purpose there are rigidly secured to both roller guides 29 of the bottle sled a pair of rods 33 which are slidable in respective slots of a pair of swingable levers 34, these levers being connected with one another at their lower ends by a connecting shaft 35. The power cylinder 32 engages with this connecting shaft by means of a swingable lever 36, one end of which is connected to the piston rod of said cylinder and the other end to the shaft 35. During the upward and downward swinging of the pair of levers 34, the bottle sled is taken along by rods 33. In this embodiment the upward and downward movement of the bottle sled controls simultaneously the supply of the washing fluid to the outer jets 7 and inner jets 6. This control is illustrated schematically in FIG. 8. The washing medium, preferably cold water, is supplied to valve 39 through a pipe 37 and a pressure regulator 38, and by pipes 40 and 41 to the jets 7 or 6. In this embodiment the valve is actuated by a pressure piece 42, laterally secured to shaft 35, and which displaces the valve rod 43, both during the upward and return movements of the bottle sled, thus twice during the stationary interval of the dipping wheel. The extent and the timing period of this double water supply to jets 7 and 6 during the rest position of the dipping wheel is determined by the design of curved edge of the pressure piece 42. The working strokes of power cylinders 23 and 32 are mutually predetermined, as will be explained in connection with FIGS. 13–15. For this purpose there is provided a regulating device 44, by means of which the working cycle may be regulated as desired. The regulating system comprises the following:

A pressure regulating device 45 behind the connection 46 for the pressure medium, control pistons 47 and 48 for the power cylinders 23 and 32, end controls 49 and 50 in the path of movement of the swingable double-armed lever 18, end controls 51 and 52 in the path of movement of the swingable lever pair 34. The pressure guiding parts are fully shown. The initial position shown in FIGS. 7 and 9 is also illustrated in FIG. 13. The piston rod of the power cylinder 23 is in the uppermost position. A working cycle commences when the air pressure supply at the control device 44 is turned on. The control piston 48 is thereby displaced, the air pressure supply is directed under the piston of power cylinder 32 and displaces the latter, and thus the bottle sled with the soiled bottles, upwards into the position shown in FIG. 14, in the direction of arrow 31 (FIG. 8) and into the bottle cells. Shortly before this, the swingable lever pair of the terminal switch 52 is moved over. This switch controls the regulating piston 47, so that the air pressure from above enters the power cylinder 23 and moves this cylinder's piston downward, and thereby the dipping wheel about the opening between two adjacent bottle cells or rows of cells. As shown in FIG. 15, as soon as the depth position is reached, the switch 50 is moved over. This switch controls the power cylinder 32, so that the bottle sled returns from the position shown in FIG. 14 into the initial position shown in FIG. 13, and receives the cleaned bottles emerging from the bottle cells of the now stationary dipping wheel. A working cycle is thus completed. This working cycle consists of loading soiled bottles into a bottle cell or a row of cells, holding the bottles in the loaded position, swinging the dipping wheel about the opening until the next cell or row of cells is aligned with the discharge or loading opening 9, and of receiving the cleaned bottles emerging therefrom. The control device 44 must be switched on anew for the next working cycle. Should these working cycles follow one another automatically the control device 44 is then operated in such a manner that the terminal switches 51 and 49 will become operative. The terminal switch 51 takes care of the movement from the upper into the lower swinging position (from the position in FIG. 14 into that of FIG. 15) in order to switch the air pressure to the underside of the power cylinder 32 from the control piston 48. The bottle sled is thus displaced again in an upward direction, while the terminal switch 49 adjusts the control piston to the return of the power cylinder 23 after the double-armed swinging lever 18 has moved over. Should it be necessary to immerse the soiled bottles for a longer period, it is possible to displace the bottle sled upward into the position shown in FIG. 14 and stop it, while the dipping wheel turns in a preset rhythm during a desired time period. The operational speed or the idling period for emptying of cleaned bottles and loading of soiled bottles can be extensively varied, within broad limits by changing the working pressure of the pressure medium and by varying the cross-sections of the individual switch members and valves.

This kind of control is safe to employ, since no damage can result should a cleaned bottle fail to come out of its cell for some reason. In such a case this bottle comes back a second time during the cycle. It is further significant that the following work cycle can only take place when the previous one has been completed. Thus, the dipping wheel starts to move only after the bottle sled has reached the top. A driving pressure of about 2 atmospheres absolute pressure is chosen, the strength of which is therefore less than would be required to crush a bottle. Should an obstruction be encountered, the bottle sled would simply come to a standstill and the air pressure would be released. This release of the air pressure may be used to actuate a siren which would summon acoustically an attendant to his work station. In addition, other alarms, particularly electrical alarms may be employed.

In a further embodiment, according to FIGS. 16–24 and FIGS. 25 and 26 illustrating an auxiliary device for removing labels and various dirt particles there is shown a modified support and construction of the dipping wheel 3 and of the bottle cells 4.

The dipping wheel 3 comprises two rims 57 of equal diameter, made of angle iron, which are rotatably supported on rotatable rollers 58. At least one of these rolls is power driven and may be provided with driving means such as meshing gears and the like. The continuous or stepwise rotation of the dipping wheel 3 is thus taken care of. The driving motor and its driving connections are not shown for the sake of simplicity. Another ring 60 of flat or round iron cross-section is provided interiorly of and spaced from both rims 57, the ring being secured by means of rods 59 to the respective rims. Cross-pieces 61, spaced from one another the distance of a bottle cell, are mounted between the rods 59 and connect both rims 57 of the dipping wheel 3. The cross-pieces act as supports for the bottle cells 4. The cross-pieces 61 are advantageously made of synthetic material, which is particularly pressure and distortion resistant. The screws or other fastening means between the cross-pieces 61 and the ring 60 are made of similar material. The ring 60 with the cross-pieces 61 suffices to hold the dipping wheel 3 together when this wheel is axially mounted.

Due to this simple construction of the dipping wheel, the latter is light in weight and may be driven by simple means. Furthermore, the mounting of the bottle cells 4 is very simple and can be placed in action in a minimum amount of time by loading between adjacent cross-pieces and a short counter swing. As shown in FIGS. 18–22, each bottle cell is provided at the outer cover, at diametrically opposed position with protruding noses 62 and 63, secured at varying heights, a rod 64 under the noses 62 and a U-shaped collar 65 provided with extensions spaced a distance corresponding to the thickness of the rod 64. The noses 62 are formed on the underside as a pair of merging annular curves 67, 66 corresponding to the diameter of the cross-rod 61, which may be locked with the forward detent finger. The noses 63 are mouth-shaped and are formed with a circular arcuate edge in the mouth's bottom corresponding substantially to the cross-bar 61, and with a longer upper lip 68. On the outer cover of the bottle cells 4 there are further secured circular shoulders 69, each set at 90° opposite the noses 62 and 63. All these shoulders provide support for the cells in the direction of the dipping wheel's rotation as well as transversely thereto. This function and the construction are both explained in FIGS. 18 and 19.

The dotted lines in FIG. 18 show the insertion of the bottle cell from above into the space between two adjacent cross-bars 61. Here the bottle cell slides past the cross-bar 61 and is emplaced with the circular edge 66 of the nose 62 on the left cross-bar 61, while the lower lip of the mouth of nose 63 slides past cross-bar 61, disposed on the right. This position is shown in solid lines in FIG. 18. The dotted lines in FIG. 19 show how the bottle cell finally turns on the left cross-bar 61, until the nose 63 overlies with the mouth's upper lip 68 the right cross-bar 61. The bottle cell then slides to the right on the mouth's upper lip 68, until the right cross-bar 61 is unlocked from the base of the mouth. The nose 62 thereby slides into the circular edge 67 and the bottle cell attains the end position shown in solid lines in FIG. 19. In this position the extension 64 protrudes into the U-shaped shoulder 65 of the oppositely disposed bottle cell. This end position may be additionally secured by pins inserted in the holes 70 and 71.

Figure 23:
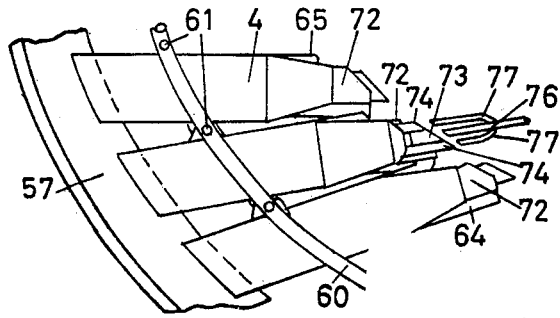
FIG. 23 illustrates an enlarged detail of the device of FIG. 1, for spraying and removing labels.
Figure 24:
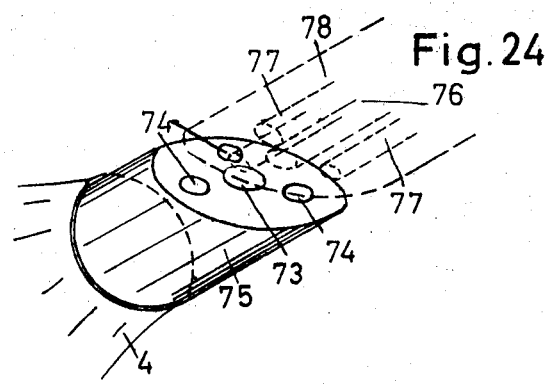
FIG. 24 shows the device of FIG. 23 in turned away position.

FIG. 23 illustrates a construction of bottle cells 4 for washing and removing labels and FIG. 24 an appropriate modified arrangement. The bottle cells 4 are normally provided at the cone ends with a forwardly inclined cylinder cover 72 which serves as an outlet water spray guard. This guard is shown in longitudinal section in FIG. 23 at the middle bottle cell and in plan view at the two other bottle cells. A tubular member 73 and about it equally spaced, peripherally distributed, three additional tubular members 74 are secured interiorly of this water spray guard and aligned centrally with the bottle neck. These serve to remove labels and for connecting the space between the outer and inner cover of the cell. They are shown in a displaced condition in the drawing. These four tubular members are slightly conical and outwardly elongated. FIG. 24 illustrates a modification in which the four slightly conical and outwardly elongated tubular members 73, 74, are joined to a common structural part, which may suitably consist of synthetic material. This structural part is simply inserted in the cylinder cover 72 of the normal form of bottle cells 4, so that this form may be used for removing labels and the like.

At least in one position in which the bottle cells are in an approximately horizontal position there is rigidly secured interiorly of the tank or vessel 1 a nozzle member comprising a central nozzle 76 and three nozzles 77 equally spaced about it. The nozzle member is designed in such a manner that it will be disposed directly adjacent the tubular members 73, 74 or 75 and in alignment therewith at a predetermined position of the dipping wheel. The three other nozzles are shown as displaced. In FIG. 24 this nozzle arrangement is shown in dotted lines as a unitary member 78 of synthetic material which thus corresponds to the unitary member 75 at the bottle cell's neck. Cleaning fluid under pressure is supplied to the nozzles 76, 77 or the nozzle member 78. The cleaning fluid streaming out of the nozzles into the tubular member 73, 74 or 75 sets the bottle in the bottle cell into a tumbling motion. The conical tubular members 73, 74 act simultaneously as injectors and aspirate additional cleaning fluid from the bath into the interior of the bottle cell, thus assisting the cycle. The loosened label and similar pastings are carried rearward by the pressure stream out of the bottle cell and arrive in the cleaning bath. There they are floated and removed.

Figure 25:
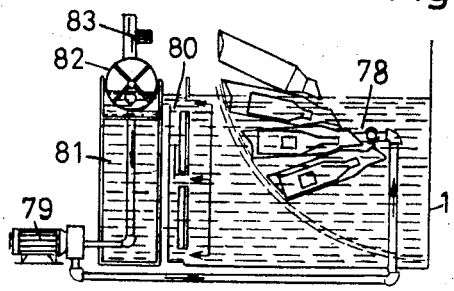
FIG. 25 is a schematic side elevational view of an embodiment of the entire installation for removing labels.
Figure 26:
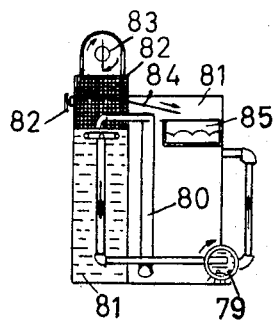
FIG. 26 is a rear elevational view of the device of FIG. 25.

FIGS. 25 and 26 illustrate such an installation. Cleaning fluid under pressure is supplied through aspiration conduit 80 to the nozzle member 78, mounted in the dipping vessel 1, by pump 79. The labels and the like, floated out rearwardly from the bottle cells, arrive into this vessel and settle on the sieve drum 82, which takes the labels along and the latter are carried through an evacuating drain 84, to a collecting container 85 by propelled air 83 or water.

The individual bottle cells 4 need not be made as unitary closed members of acid-resistant materials. Each of the adjacent bottle cells may be assembled from separate component shells. Preferably, each separate shell would then comprise a half of an adjacent shell in the direction of rotation.

What I claim is:

1. Apparatus for cleaning heavily soiled bottles, comprising a vessel, a dipping wheel, a horizontal shaft for said dipping wheel, secured in said vessel, a plurality of bottle cells secured to said wheel peripherally thereof, said bottle cells having conical neck portions directed inwardly of said wheel and opposite insertion openings, and having their axes disposed at a sharp angle to the wheel's tangents, a supporting frame for spray nozzles mounted in the upper portion of said vessel concentrically of said wheel, a plurality of spray nozzles secured on said frame said nozzles being in axial alignment with said cells, a loading and unloading support exteriorly secured to said vessel at a 30° angle, a displaceable member adapted for movement along said support and slide rollers supporting said member, said bottle cells being arranged in a plurality of adjacent circular rows in coextensive planes, a supporting guard in said vessel, disposed under said dipping wheel and concentric thereto, a perforated disk mounted on said shaft, said disk having a plurality of peripherally disposed detent holes corresponding in number to the number of said cells, a displaceable detent bolt arranged on one side of said disk and adapted to engage with said holes, an eccentric mounted on said shaft, a swingable lever mounted on said eccentric adjacent the other side of said disk, said lever being provided with an impact bolt for displacing said detent bolt and means for swinging said lever about said eccentric, said means for swinging said lever comprising a lower cylinder, said cylinder having a piston rod connected to said lever by a ball joint.

2. Apparatus according to claim 1, wherein the bottle cell ends are cylindrical and are formed with diagonal ends relative to the inner periphery and an inner ring member spaced from the cover, and having a tubular opening between the ring member and the cover of the bottle neck ends spaced equally and extending conically outwards and ending at the lever of the cover and wherein said spray means comprise spray nozzles, said spray nozzles being aligned with the ring member and the tubular members and adapted for connection with a conduit for pressurized streams.

3. Apparatus according to claim 1, wherein said swingable lever is provided with a U-shaped swingable yoke, said yoke being provided with impact bolt directed towards the disc, and means for actuating the lever on said apparatus.

4. Apparatus according to claim 1, wherein said means for actuating said lever is a power cylinder, said power cylinder being provided with a piston rod, coupling means and a lever connecting said coupling means with the eccentric shaft.

5. Apparatus according to claim 1, further provided with an actuating lever for displacing said slide rollers, valve means for said spray nozzles, said lever being operatively connected wtih said valve means, and a power cylinder for operating said lever.

6. Apparatus according to claim 5, wherein said bottle cells are provided with extensions for pivoting said cells and pins for locking said extensions at predetermined positions and are further provided with extensions interiorly of the bottle cells, said extensions being formed as weak ribs.

References Cited by the Examiner

UNITED STATES PATENTS

| | | | |
|---|---|---|---|
| 838,927 | 12/1906 | Wickham | 134—142 X |
| 1,212,459 | 1/1917 | Dawson | 134—142 |
| 1,289,326 | 12/1918 | Walker et al. | 134—142 X |
| 1,692,190 | 11/1928 | Templeton | 134—142 X |
| 2,537,053 | 1/1951 | Hemmeter | 134—142 X |
| 2,675,011 | 4/1954 | Maddaford | 134—79 |

FOREIGN PATENTS

| | | |
|---|---|---|
| 513,488 | 2/1921 | France. |
| 310,270 | 4/1929 | Great Britain. |

CHARLES A. WILLMUTH, *Primary Examiner.*

ROBERT L. BLEUTGE, *Assistant Examiner.*